(12) United States Patent
Kinoshita

(10) Patent No.: US 8,145,858 B2
(45) Date of Patent: Mar. 27, 2012

(54) INTERLEAVE CONTROL DEVICE, INTERLEAVE CONTROL METHOD, AND MEMORY SYSTEM

(75) Inventor: Tadaaki Kinoshita, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/833,596

(22) Filed: Jul. 9, 2010

(65) Prior Publication Data

US 2011/0010511 A1    Jan. 13, 2011

(30) Foreign Application Priority Data

Jul. 9, 2009  (JP) ................................ 2009-162930

(51) Int. Cl.
 *G06F 12/00* (2006.01)
(52) U.S. Cl. ........................ 711/157; 711/154
(58) Field of Classification Search .................. None
See application file for complete search history.

(56) References Cited

U.S. PATENT DOCUMENTS

| | | | |
|---|---|---|---|
| 5,809,555 A * | 9/1998 | Hobson | 711/172 |
| 6,304,923 B1 * | 10/2001 | Klein | 710/41 |
| 6,745,277 B1 * | 6/2004 | Lee et al. | 711/5 |
| 2006/0184758 A1 * | 8/2006 | Satori et al. | 711/168 |
| 2008/0140914 A1 | 6/2008 | Jeon | |
| 2008/0313391 A1 | 12/2008 | Iwanari et al. | |

FOREIGN PATENT DOCUMENTS

| | | |
|---|---|---|
| JP | 63-026744 | 2/1988 |
| JP | 05-134924 | 6/1993 |
| JP | 2689452 | 8/1997 |
| JP | 2005-266888 | 9/2005 |
| JP | 2006-099594 | 4/2006 |
| JP | 2007-213179 | 8/2007 |
| JP | 2008-234514 | 10/2008 |
| JP | 2008-310841 | 12/2008 |

OTHER PUBLICATIONS

Information Sheet for preparing an Information Disclosure Statement under Rule 1.56.

* cited by examiner

*Primary Examiner* — Reginald Bragdon
*Assistant Examiner* — Stella Eun
(74) *Attorney, Agent, or Firm* — Knobbe Martens Olson & Bear, LLP

(57) ABSTRACT

According to one embodiment, an interleave control device of a memory system includes a memory divided into sections, and a data bus used, in common, for data transfers for the sections, the device comprises a detector and a start module. The detector is configured to detect a transfer of data of a predetermined size during a transfer of data on the data bus to be written to a certain section of the memory or data read from the section. The start module is configured to start a transfer of interleave control data in place of the data to be written or the read data when the detector detects the transfer of the data of the predetermined size.

13 Claims, 17 Drawing Sheets

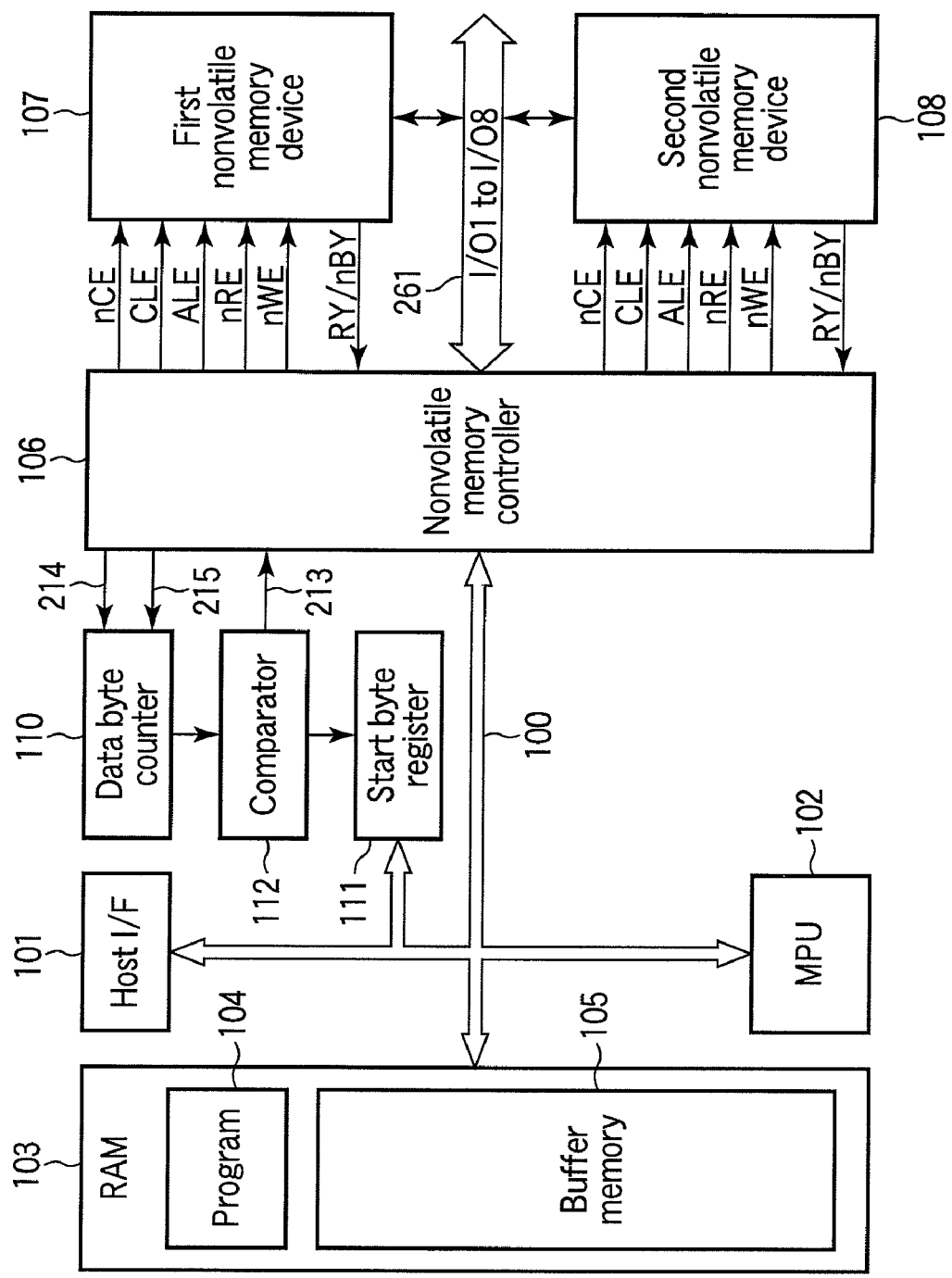
F I G. 1

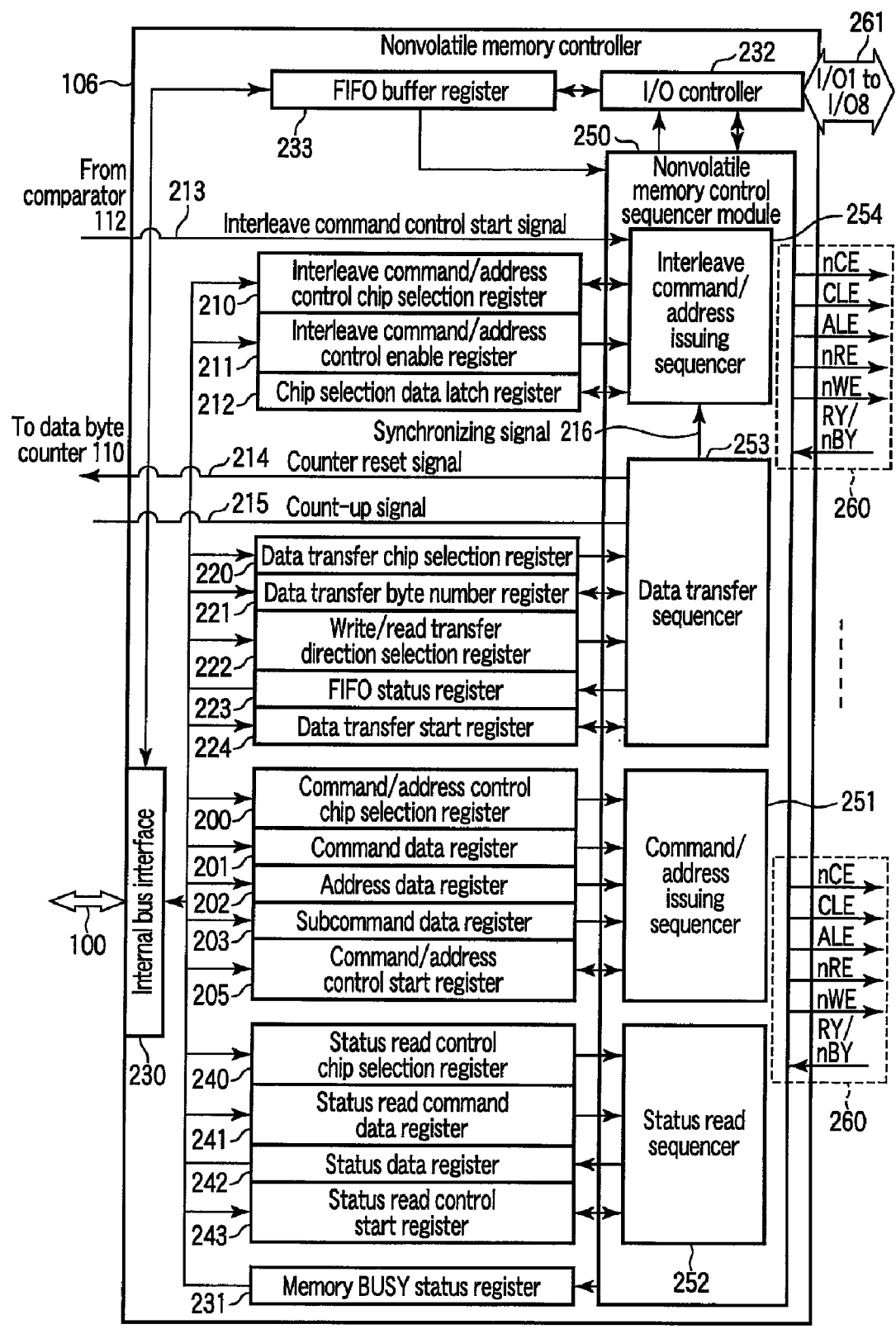
F I G. 2

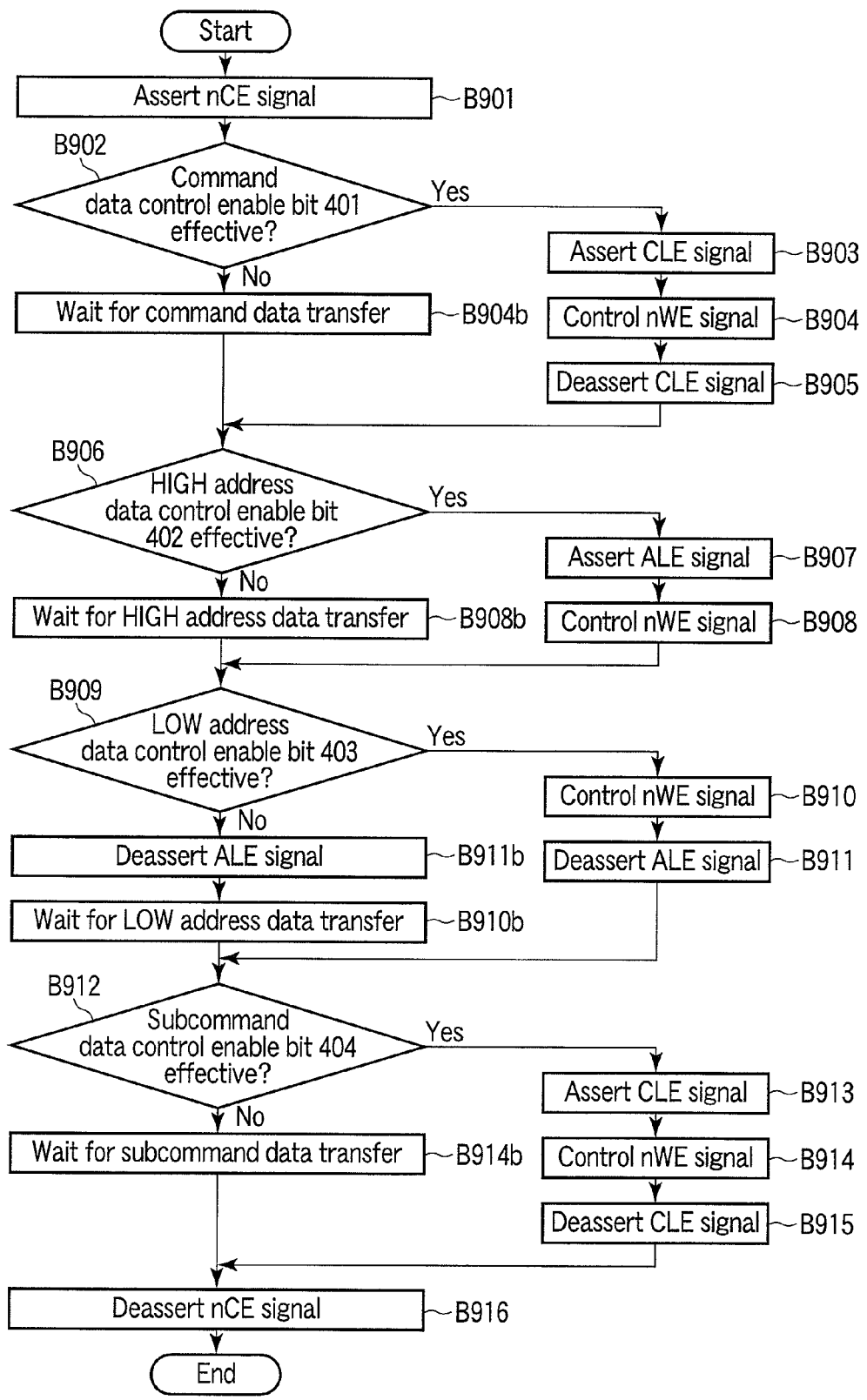
F I G. 9

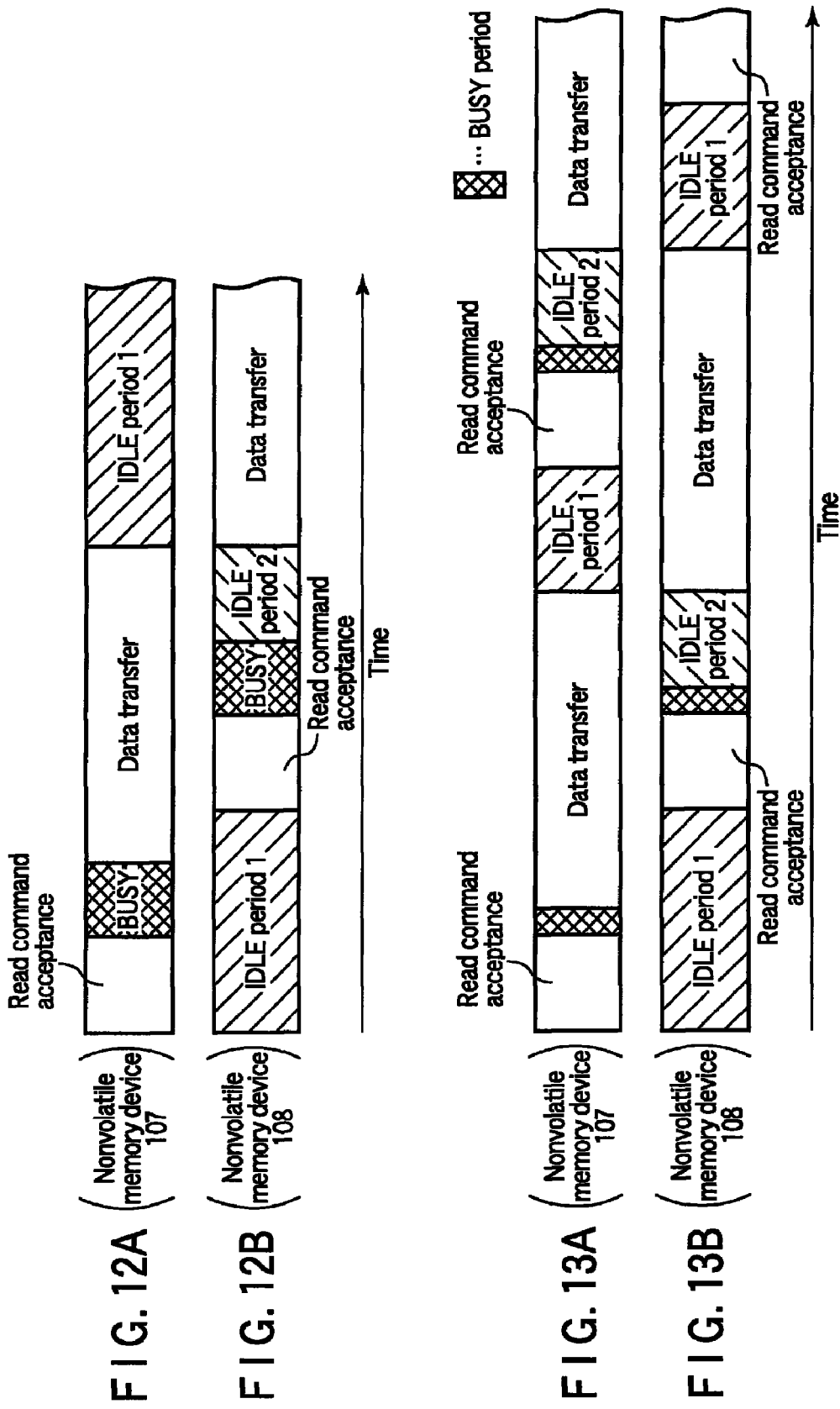

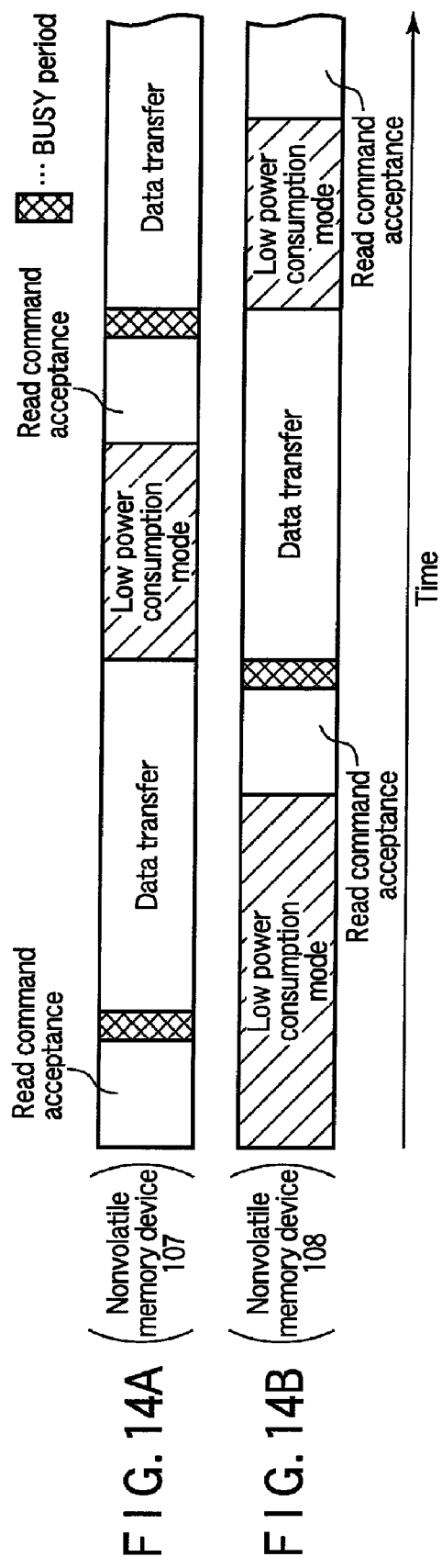

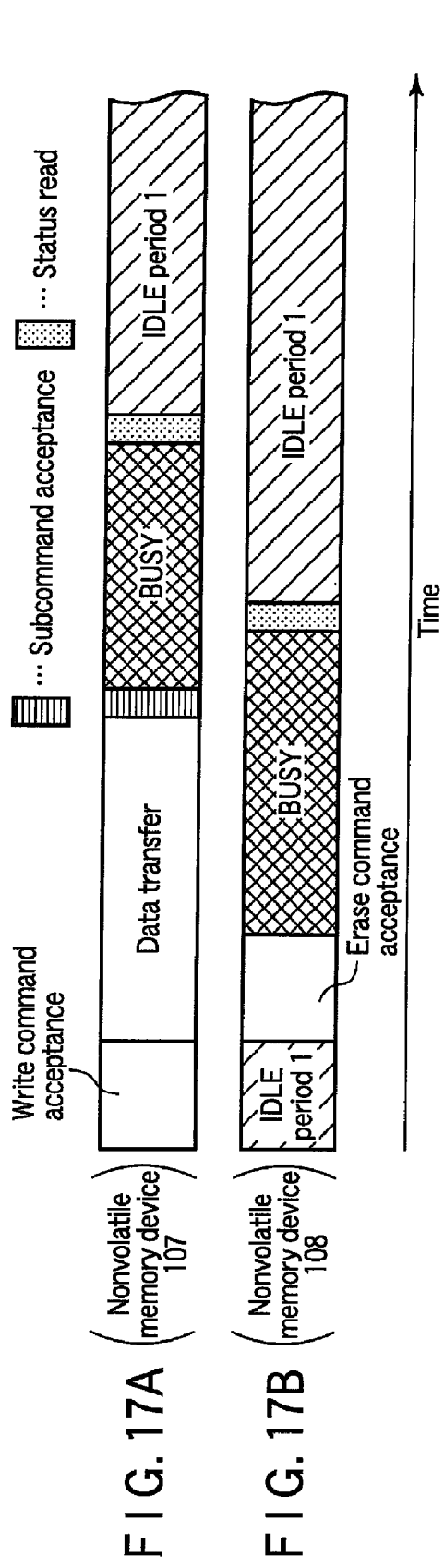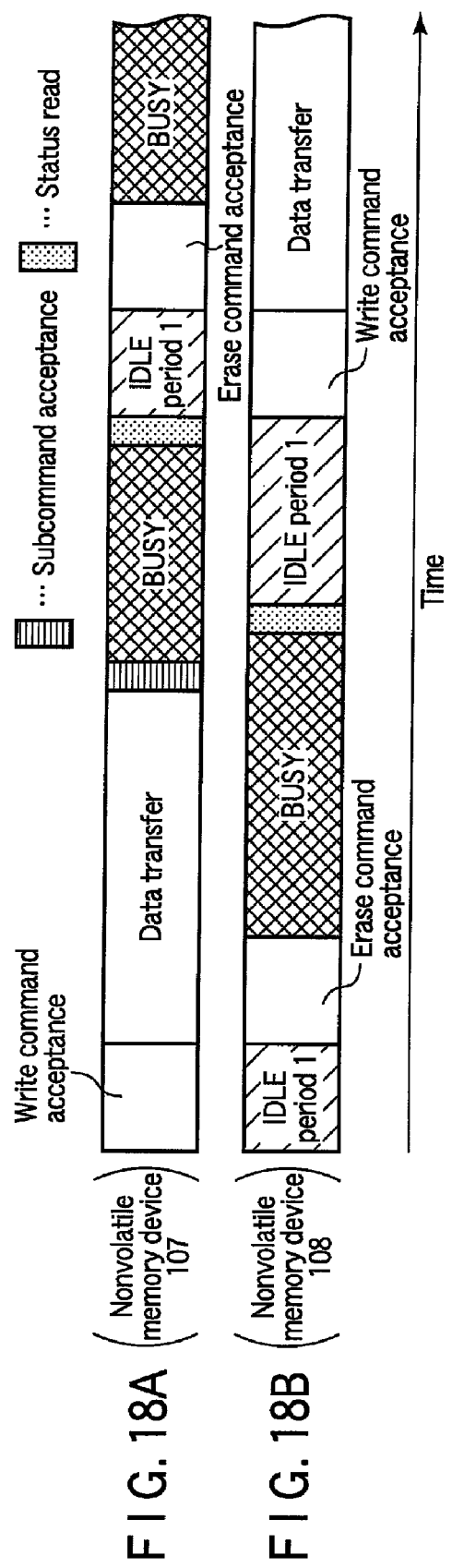
F I G. 17A, F I G. 17B, F I G. 18A, F I G. 18B

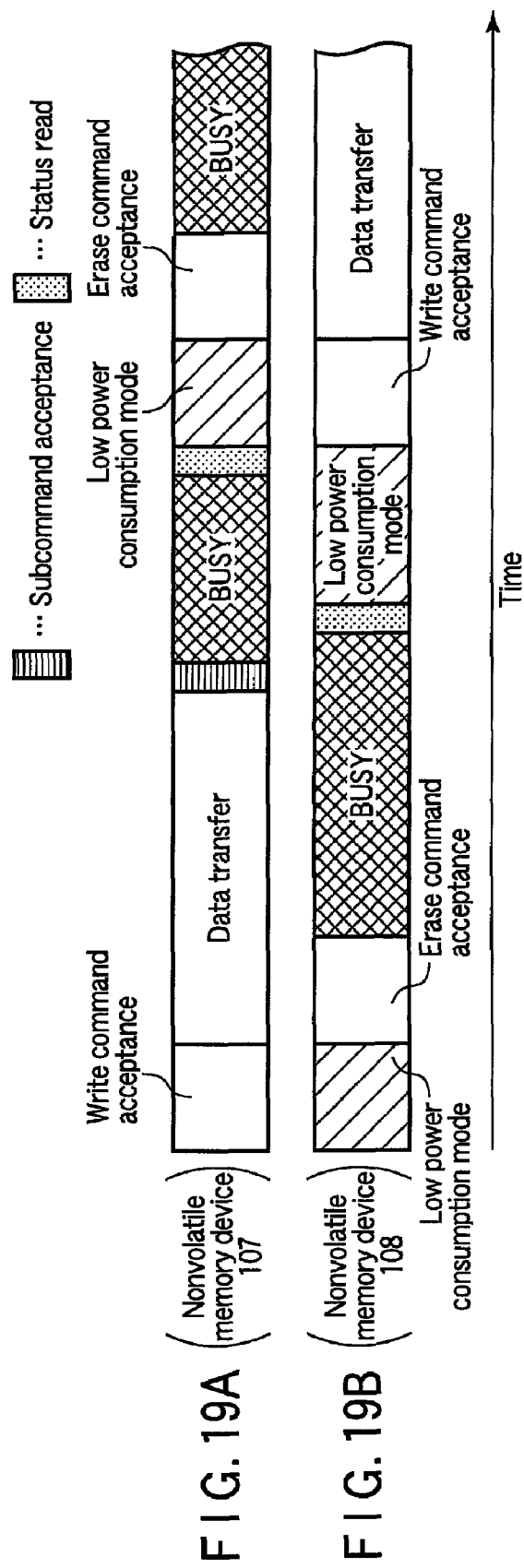

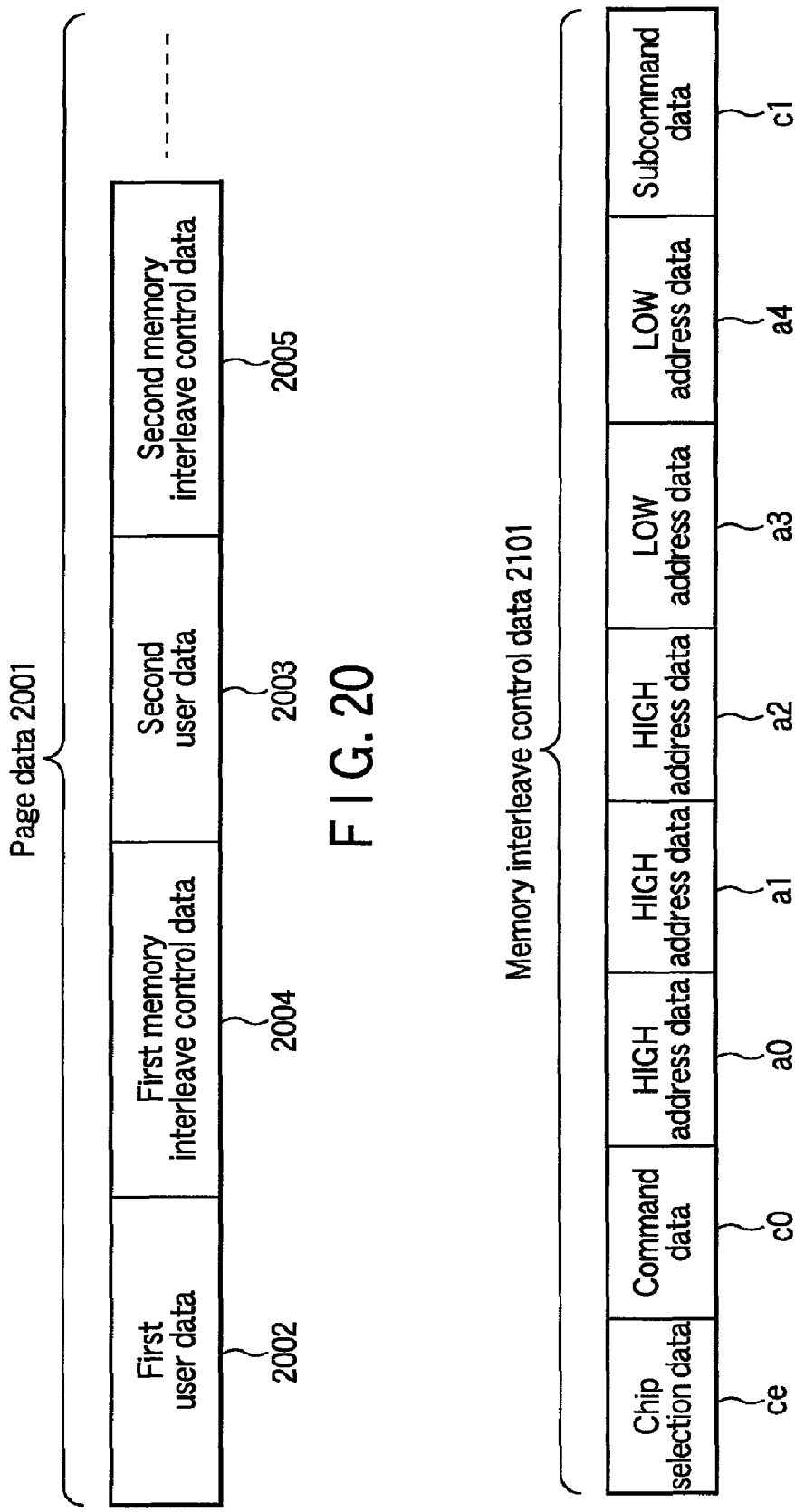

INTERLEAVE CONTROL DEVICE, INTERLEAVE CONTROL METHOD, AND MEMORY SYSTEM

CROSS-REFERENCE TO RELATED APPLICATIONS

This application is based upon and claims the benefit of priority from Japanese Patent Application No. 2009-162930, filed Jul. 9, 2009; the entire contents of which are incorporated herein by reference.

FIELD

Embodiments described herein relate generally to an interleave control device, interleave control method, and memory system in a storage device using a flash memory which is a nonvolatile semiconductor storage device called a Solid State Drive or Solid State Disk (SSD).

BACKGROUND

Some storage devices are provided with a function called memory interleave, which is configured to bring the speed of a memory access operation closer to the speed of a high-speed processor. The memory interleave function is configured to divide a memory into a plurality of (for example, two) areas called banks, enable each of the divided banks to independently operate, and carry out read/write simultaneously or alternately.

In a storage device described in Japanese Patent No. 2689452, starting circuits 1-0 and 1-1 provided in a bank 0 and bank 1, and capable of operating parallel to each other receive a command to carry out read or write, and an access request signal R1 configured to designate a bank, address, and data length for the command, and output a start request signal S0 or S1 configured to start an access operation of the designated bank 0 or bank 1. When the designated address and data length extend to the next bank 1 or bank 0, the starting circuits 1-0 and 1-1 issue a command to carry out read or write for the next bank 1 or bank 0, and an access request signal R2 or R3 designating a next bank for the command, subsequent address, and remaining data length.

Further, address generating circuits 2-0 and 2-1 respectively provided in the bank 0 and bank 1 receive a start request signal S0 or S1 from the starting circuit 1-0 or 1-1, generate a signal configured to select an address for each word which is a data address unit, in sequence from the designated address in a designated bank up to an address of a boundary of the bank or the last address of the designated data length, and output the generated signals collectively as four address selection signals A0, A1, A2, and A3 in data access units.

According to the storage device described in the patent document, it is possible to carry out block transfer at high speed or carry out interleave transfer at high speed according to the contents of the access request signal. This makes it possible to operate both data having consecutive addresses and data having nonconsecutive addresses at a high processing speed.

In the device described in the patent document, a memory address configured to access the memory interleave is generated from an immediately preceding request address. As a result of this, it is necessary for interleave-controlled addresses to be related to each other by way of an address generation circuit, and hence it is not possible to carry out arbitrary addressing.

Further, interleave control data is sent after completion of transfer of one transfer unit (for example, 512 bytes) of write data or read data. As a result of this, the transfer time of the whole data is prolonged by the transfer time of the interleave control data.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary block diagram showing a system configuration of an embodiment of an interleave control device.

FIG. 2 is an exemplary block diagram showing an internal configuration of a nonvolatile memory controller 106.

FIG. 9 is an exemplary flowchart showing a processing flow of an interleave command/address issuing sequencer 254.

FIGS. 12A and 12B show an exemplary state diagram of the nonvolatile memory devices of a case where the memory interleave control flow of FIG. 10 is carried out.

FIGS. 13A and 13B show another exemplary state diagram of the nonvolatile memory devices of a case where the memory interleave control flow of FIG. 10 is carried out.

FIGS. 14A and 14B show still another exemplary state diagram of the nonvolatile memory devices of a case where the memory interleave control flow of FIG. 10 is carried out.

FIGS. 17A and 17B show an exemplary state diagram of the nonvolatile memory devices of a case where the memory interleave control flow of FIG. 15 is carried out.

FIGS. 18A and 18B show another exemplary state diagram example of the nonvolatile memory devices of a case where the memory interleave control flow of FIG. 15 is carried out.

FIGS. 19A and 19B show still another an exemplary state diagram of the nonvolatile memory devices of a case where the memory interleave control flow of FIG. 15 is carried out.

FIG. 20 is an exemplary view showing a modification example of a memory interleave control data.

FIG. 21 is an exemplary view showing a modification example of an interleave command/address issuing sequencer processing flow.

DETAILED DESCRIPTION

Figure 3:
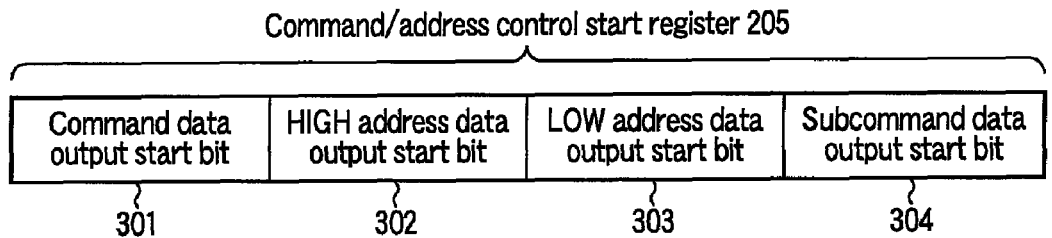
FIG. 3 is an exemplary view showing an internal configuration of a command/address control start register 205.

Various embodiments will be described hereinafter with reference to the accompanying drawings. In general, according to one embodiment, an interleave control device of a memory system comprising a memory divided into sections, and a data bus used, in common, for data transfers for the sections, the device comprises a detector; and a start module. The detector is configured to detect a transfer of data of a predetermined size during a transfer of data on the data bus to be written to a certain section of the memory or data read from the section. The start module is configured to start a transfer of interleave control data in place of the data to be written or the read data when the detector detects the transfer of the data of the predetermined size.

FIG. 1 shows an example of the system configuration of an embodiment of an interleave control circuit. Although the embodiment will be described by taking a nonvolatile NAND flash memory as an example of a memory device, the storage medium is not limited to this, and any type of storage medium may be employed.

A host I/F 101, MPU 102, RAM 103, nonvolatile memory controller 106, and start byte register 111 are connected to a system bus 100. The host I/F 101 is connected to a host system (not shown) such as a personal computer or the like.

The nonvolatile memory controller 106 transfers data to nonvolatile memory devices 107 and 108 such as NAND flash memories through an I/O bus 261 (including I/O1 to I/O8). The nonvolatile memory controller 106 supplies various control signals such as a chip select signal CE, and the like directly to the nonvolatile memory devices 107 and 108. The number of nonvolatile memory devices 107 and 108 has only to be plural, and is not limited to two. Further, the memory devices 107 and 108 need not be devices physically different from each other, and may be a memory device logically divided into sections (the sections are called banks).

The RAM 103 includes a program area 104 and buffer memory 105. The program area 104 stores a program configured to access data stored in the nonvolatile memory devices 107 and 108 through the nonvolatile memory controller 106 in response to a data transfer request from the host I/F 101 and to carry out data transfer control. The MPU 102 executes the program. The buffer memory 105 is used as a primary data buffer at that time for each page data item.

In the start byte register 111, an appropriate value is set in advance by a program (firmware) when memory interleave control is to be carried out, and the value is compared with a value of a data byte counter 110 operating on the basis of a counter reset signal 214 and count-up signal 215 (see FIG. 2) from the nonvolatile memory controller 106 by a comparator 112. When the values of both the members become equal to each other, the comparator 112 sends an interleave command control start signal 213 (see FIG. 2) to the nonvolatile memory controller 106.

FIG. 2 shows an internal configuration example of the nonvolatile memory controller 106.

The nonvolatile memory controller 106 is connected to each nonvolatile memory device through a nonvolatile memory control signal group 260 in terms of the control signal, and is connected in common to each nonvolatile memory device through the I/O bus 261 in terms of the data.

The memory control signal group 260 for each nonvolatile memory device is controlled by a nonvolatile memory control sequencer module 250, and regarding the data transfer control on the I/O bus 261, the nonvolatile memory control sequencer module 250 outputs data on various registers through an I/O controller 232 or inputs the data to the various registers. An RY/nBY signal notifies the RY/nBY (Ready/not Busy) signal state of each nonvolatile memory device to a memory busy status register 231. The various registers are accessible from the MPU 102 through an internal bus interface 230.

The nonvolatile memory control sequencer module 250 includes a command/address issuing sequencer 251, status read sequencer 252, data transfer sequencer 253, and interleave command/address issuing sequencer 254.

The command/address issuing sequencer 251 is started simultaneously with the write to a command/address control start register 205, outputs values of a command data register 201, address data register 202, and subcommand data register 203 onto the I/O bus 261 according to the value of the command/address control start register 205, and controls the memory control signal group 260 for the nonvolatile memory device selected by a command/address control chip selection register 200. Concurrently with the termination of the control processing, the data which has been written to the command/address control start register 205 is cleared.

The data transfer sequencer 253 is started when certain data is written to a data transfer start register 224, and carries out data transfer processing for the nonvolatile memory device selected by a data transfer chip selection register 220 while controlling the memory control signal 260 of the nonvolatile memory device according to registers including a write/read transfer direction selection register 222 configured to determine the data input/output direction on the I/O bus 261 through the I/O controller 232, data transfer byte number register 221, and FIFO buffer register 233. At the time of the processing, the data transfer sequencer 253 outputs a count-up signal 215 and counter reset signal 214 at the appropriate times. A FIFO status register 223 is a register capable of indicating that the FIFO buffer register 233 is full of data or empty. The data transfer byte number register 221 indicates the number of remaining data bytes to be transferred. Concurrently with the termination of the control processing, data which has been written to the data transfer start register 224 is cleared.

The status read sequencer 252 is started when certain data is written to a status read control start register 243, outputs a value of a status read command data register 241 to the nonvolatile memory device selected by a status read control chip selection register 240 while controlling the memory control signal group 260 on the I/O bus 261, and latches data from the nonvolatile memory device into a status data register 242. Concurrently with the termination of the control processing, the data which has been written to the status read control start register 243 is cleared.

Upon receipt of an interleave command/address control start signal 213, in the case where any one of the effective bits of an interleave command/address control enable register 211 is in the enabled state, the interleave command/address issuing sequencer 254 controls the memory control signal group 260 for the nonvolatile memory device selected by an interleave command/address control chip selection register 210 according to a synchronizing signal 216 of the data input/output operation of the data transfer sequencer 253, and a value of the interleave command/address control enable register 211. A chip selection data latch register 212 latches first data appeared on the I/O bus 261 after the operation of the interleave command/address issuing sequencer 254, and operates in substitution for the interleave command/address control chip selection register 210. This operation becomes necessary when the memory interleave control which is in accordance with chip selection data cue provided in a memory interleave control data 2101, to be described later with reference to FIG. 21, is to be carried out.

FIG. 3 shows the internal configuration of the command/address control start register 205. A command data output start bit 301, high address data output start bit 302, low address data output start bit 303, and subcommand data output start bit 304 respectively determine whether or not a value of the command data register 201, value of a higher-order address byte group of the address data register 202, value of a lower-order address byte group of the address data register 202, and value of the subcommand data register 203 should be respectively output as well as the output of any one of the signals of the memory control signal group 260 to the nonvolatile memory device.

Figure 4:
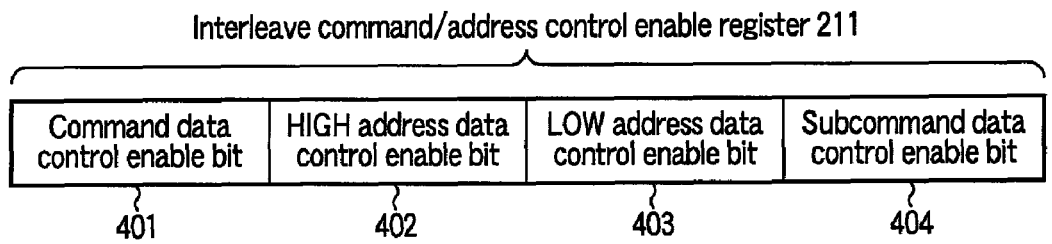
FIG. 4 is an exemplary view showing an internal configuration of an interleave command/address control enable register 211.

FIG. 4 shows the internal configuration of the interleave command/address control enable register 211. A command data control enable bit 401, high address data control enable bit 402, low address data control enable bit 403, and subcommand data control enable bit 404 respectively determine whether or not any one of the signals of the memory control signal group 260 should be output to the nonvolatile memory device.

Figure 5A:
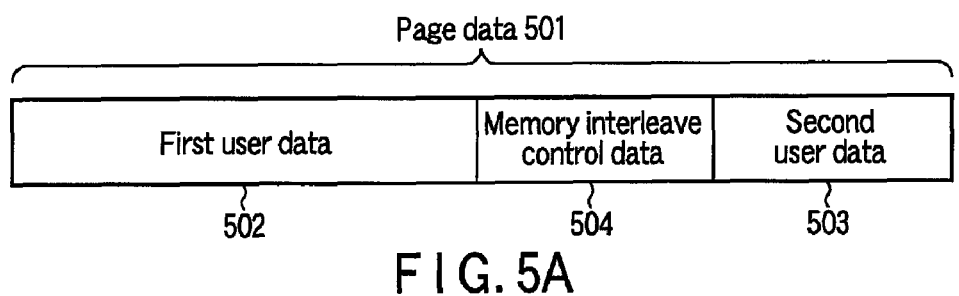
FIGS. 5A, 5B, and 5C are exemplary views showing internal configurations of page data 501.
Figure 5B:
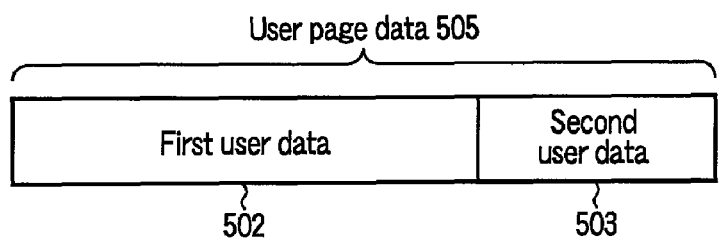
Figure 5C:
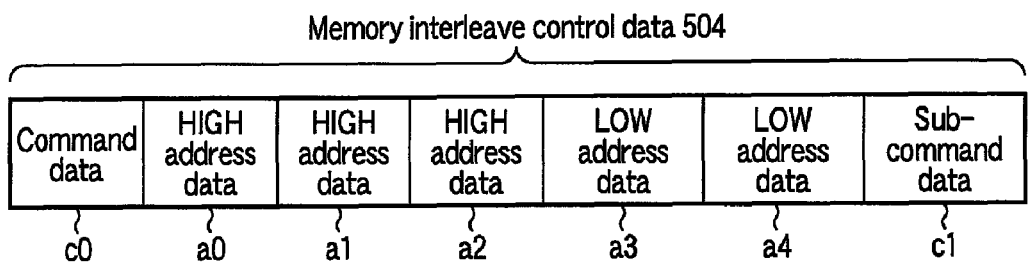

FIGS. 5A, 5B, and 5C respectively show a data unit to be handled by the data transfer sequencer 253. One unit is page data 501 and, depending on the position of a memory interleave control data 504, a user data is divided into a plurality of sections 502 and 503 in some cases. Although FIG. 5A shows a case where the user data is divided into the sections 502 and 503, the memory interleave control data 504 may be arranged at the front of or behind the user data. The dividing position of each page, and information on the presence/absence of the effectiveness of the memory interleave control data are table-managed on the RAM 103, or by another management method, such as a centralized management method. However, the method is not particularly limited.

As shown in FIG. 5B, the user data 502 and 503 can be combined and handled from the host I/F 101 as one user page data item 505. As shown in FIG. 5C, the memory interleave control data 504 includes a data group necessary for controlling the nonvolatile memory device, including command data c0, high address data items a0, a1, and a2, low address data items a3 and a4, and subcommand data c1. Further, regarding the memory interleave control data 504, if the interleave command/address issuing sequencer 254 is not operated during transfer of the page data 501, the value thereof can be neglected. At the time of write data transfer carried out by firmware, the memory interleave control data 504 can be easily changed at the time of programming and, at the time of read data transfer, the control data 504 can be easily changed by rewriting in advance the combined addresses of the interleave control. Accordingly, it is possible to arbitrarily set the memory address used to access the memory interleave.

Figure 6:
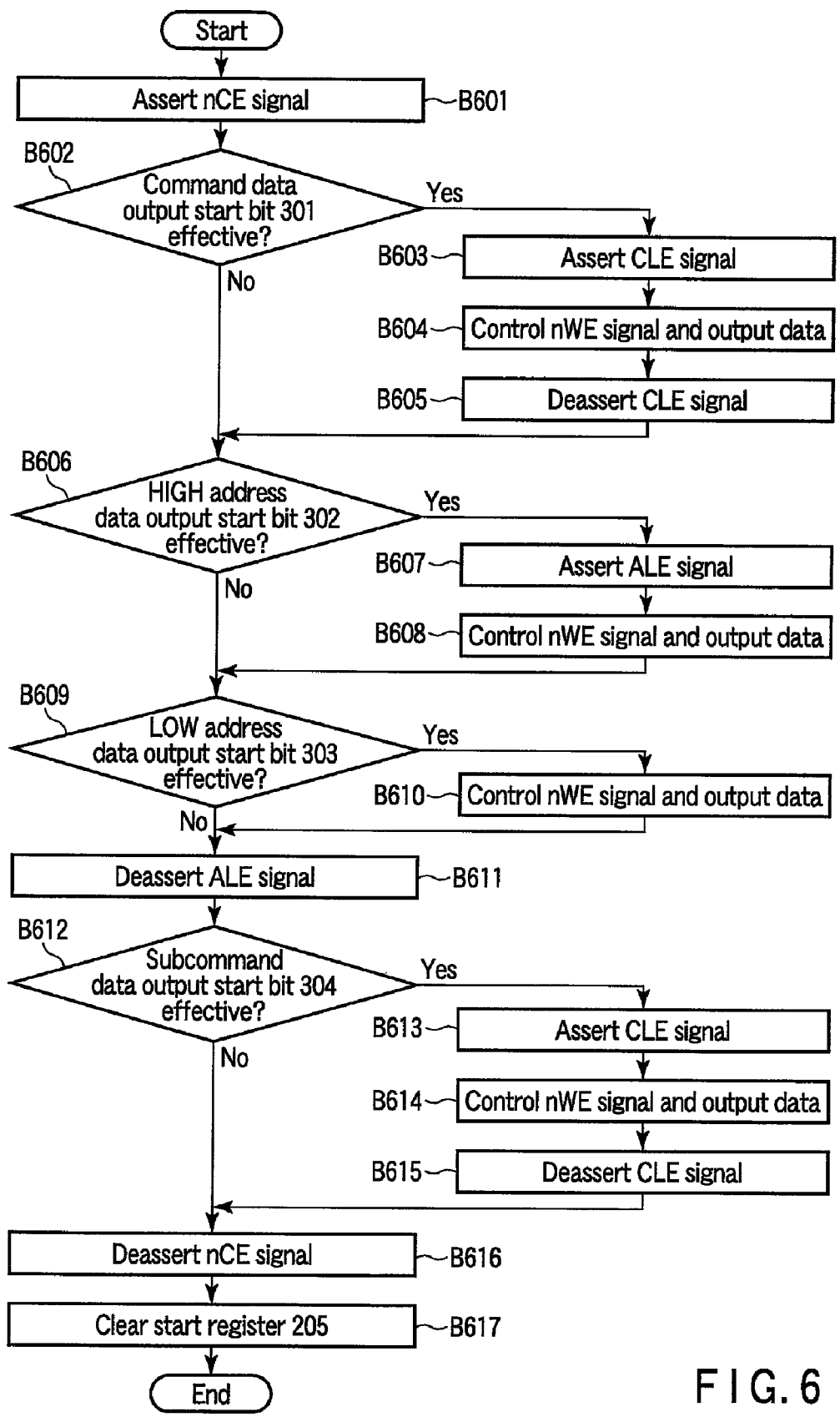
FIG. 6 is an exemplary flowchart showing a processing flow of a command/address issuing sequencer 251.

FIG. 6 shows a processing flow of the command/address issuing sequencer 251. The command/address issuing sequencer 251 is started to operate simultaneously with write of certain data to the command/address control start register 205.

In block B601, the nCE signal of the memory control signal group 260 for the nonvolatile memory device selected by the command/address control chip selection register 200 is asserted (nCE signal is at the Low level). In block B602, it is determined whether or not a command data output start bit 301 in the command/address control start register 205 is effective.

When the command data output start bit 301 is effective, assertion (High level) of the CLE signal of the memory control signal group 260 is carried out in block B603, data output of the command data register 201 is carried out together with the control of the nWE signal in block B604, and deassertion of the CLE signal (Low level) is carried out in block B605.

When the command data output start bit 301 is not effective, or subsequent to block B605, it is determined in block B606 whether or not the high address data output start bit 302 in the command/address control start register 205 is effective. When the high address data output start bit 302 is effective, assertion (High level) of the ALE signal of the memory control signal group 260 is carried out in block B607, and output of the high address data of the address data register 202 is carried out in block B608 together with the control of the nWE signal.

When the high address data output start bit 302 is not effective, or subsequent to B608, it is determined in block B609 whether or not the low address data output start bit 303 in the command/address control start register 205 is effective. When the low address data output start bit 303 is effective, output of the low address data of the address data register 202 is carried out in block B610 together with the control of the nWE signal.

When the low address data output start bit 303 is not effective, or subsequent to block B610, deassertion (ALE signal is at the Low level) of the ALE signal of the memory control signal group 260 is carried out in block B611.

In block B612, it is determined whether or not the subcommand data output start bit 304 in the command/address control start register 205 is effective. When the subcommand data output start bit 304 is effective, assertion (High level) of the CLE signal of the memory control signal group 260 is carried out in block B613, data output of the subcommand data register 203 is carried out in block B614 together with the control of the nWE signal, and deassertion (Low level) of the CLE signal is carried out in block B615.

When the subcommand data output start bit 304 is not effective, or subsequent to block B615, deassertion (nCE signal is at the high level) of the nCE signal of the memory control signal group 260 is carried out in block B616, and the data which has been written to the command/address control start register 205 is cleared in block B617, thereby terminating the sequencer processing.

Figure 7:
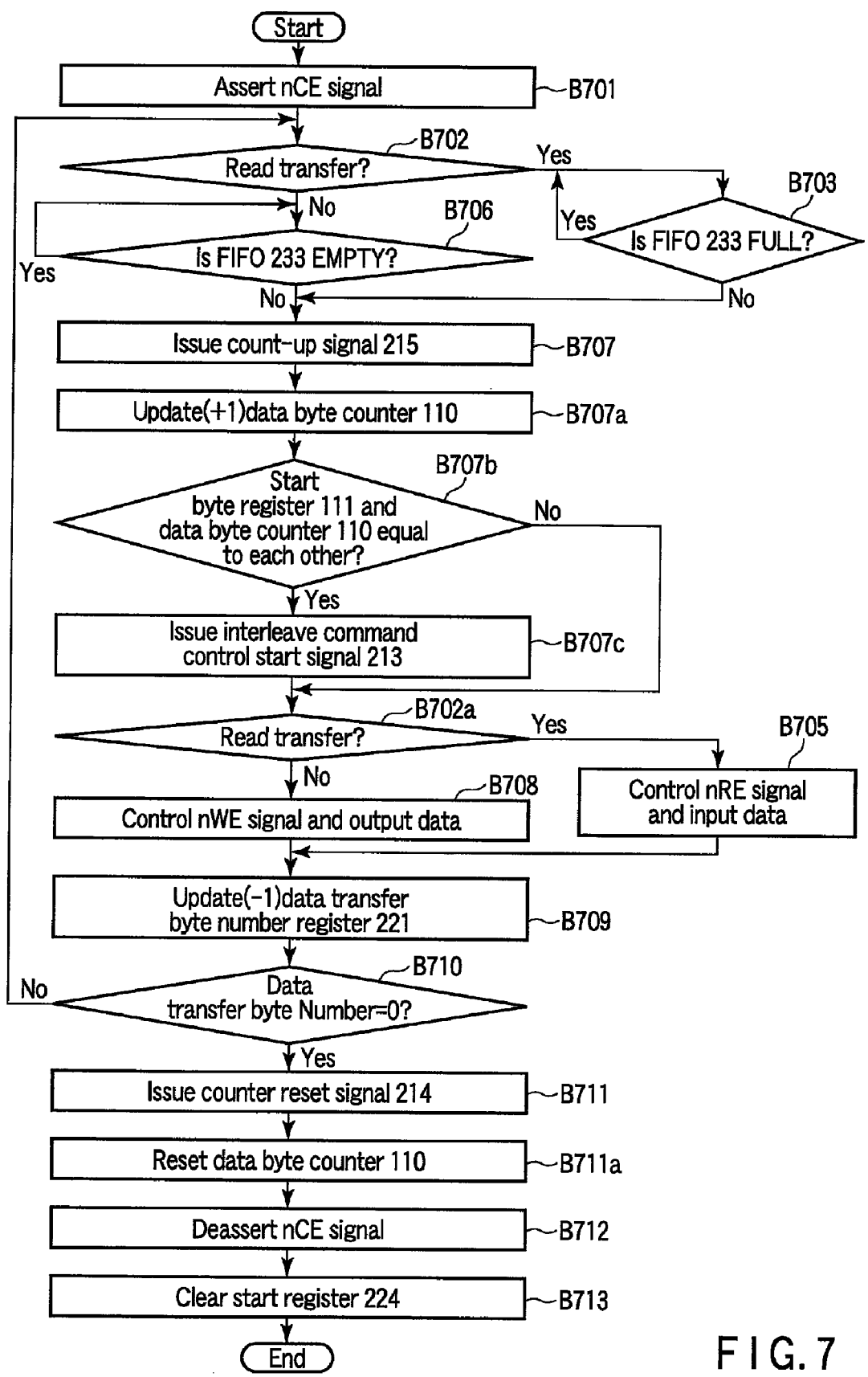
FIG. 7 is an exemplary flowchart showing a processing flow of a data transfer sequencer 253.

FIG. 7 shows a processing flow of the data transfer sequencer 253. The data transfer sequencer 253 is started to operate simultaneously with write of certain data to the data transfer start register 224.

In block B701, the nCE signal of the memory control signal group 260 for the nonvolatile memory device selected by the data transfer control chip selection register 220 is asserted (nCE signal is at the Low level). In block B702, it is determined whether or not the write/read transfer direction selection register 222 indicates read transfer.

When the write/read transfer direction selection register 222 indicates read transfer, the FIFO buffer register 233 is waited for until the register 233 becomes not full in block B703. When the write/read transfer direction selection register 222 does not indicate read transfer, the FIFO buffer register 233 is waited for until the register 233 becomes not empty in block B706.

When the waiting state of block B703 or block B706 is dissolved, a count-up signal 215 is output in block B707. In block B707a, the data byte counter 110 increases the count value of the count-up signal 215 by one byte. It is determined by the comparator 112 in block B707b whether or not the values of the data byte counter 110 and start byte register 111 are equal to each other. When both the values are equal to each other, the comparator 112 issues an interleave command control start signal 213 in block B707c.

Thereafter, in block B702a, it is determined whether or not the write/read transfer direction selection register 222 indicates read transfer. When the write/read transfer direction selection register 222 indicates read transfer, input of the byte data on the I/O bus 261 to the FIFO buffer register 233 is carried out through the I/O controller 232 together with the control of the nRE signal of the memory control signal group 260 in block B705. When the write/read transfer direction selection register 222 does not indicate read transfer, output of the byte data from the FIFO buffer register 233 to the I/O bus 261 is carried out through the I/O controller 232 together with the control of the nWE signal of the memory control signal group 260 in block B708.

Subsequently to block B705 or block B708, one byte is subtracted from the value of the data transfer byte number register 221 in block B709. It is determined in block B710 whether or not the value of the data transfer byte number register 221 is 0. When the value of the data transfer byte number register 221 is not 0, the flow is returned to block B702, and data transfer is repeated again. When the value of the data transfer byte number register 221 is 0, a counter reset signal 214 is output in block B711. In block B711a, the value of the data byte counter 110 is reset in block B711a. In block B712, the nCE signal of the memory control signal group 260 is deasserted (nCE signal is at the high label) and, in block B713, the data which has been written to the data transfer start register 224 is cleared, thereby terminating the sequencer processing.

Figure 8:
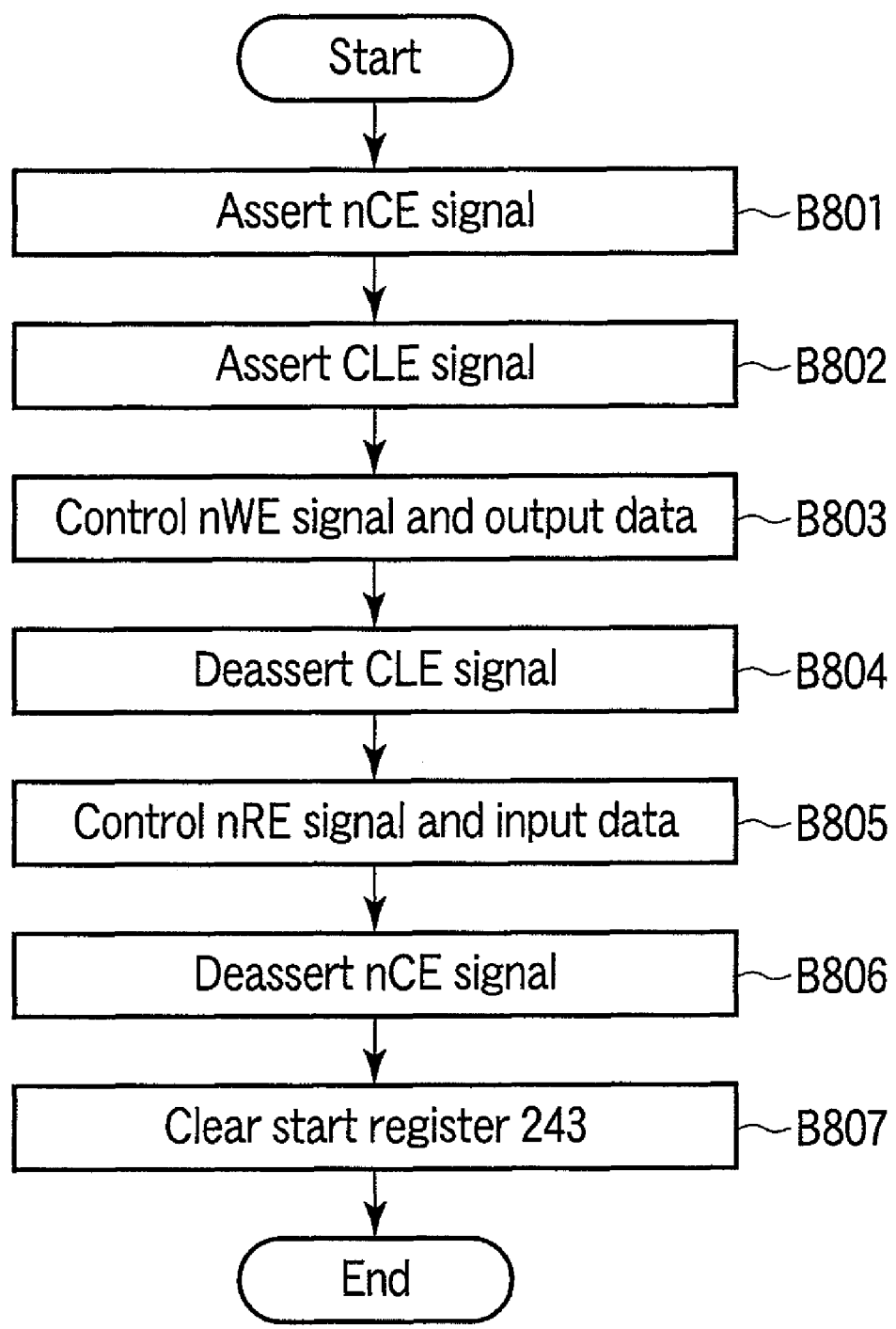
FIG. 8 is an exemplary flowchart showing a processing flow of a status read sequencer 252.

FIG. 8 shows a processing flow of the status read sequencer 252. The status read sequencer 252 is started to operate simultaneously with write of certain data to the status read control start register 242.

In block B801, the nCE signal of the memory control signal group 260 for the nonvolatile memory device selected by the status read control chip selection register 240 is asserted (nCE signal is at the Low level). In block B802, the CLE signal of the memory control signal group 260 is asserted (High level). In block B803, data output of the status read command data register 241 is carried out together with the control of the nWE signal. In block B804, the CLE signal is deasserted (Low level).

In block B805, input of the byte data on the I/O bus 261 to the status data register 242 is carried out through the I/O controller 232 together with the control of the nRE signal of the memory control signal group 260. In block B806, the nCE signal of the memory control signal group 260 is deasserted (nCE signal is at the high level). In block B807, the data which has been written to the status read control start register 243 is cleared, thereby terminating the sequencer processing.

FIG. 9 shows a processing flow of the interleave command/address issuing sequencer 254. Upon receipt of an interleave command control start signal 213 in a state where any one of the effective bits of the interleave command/address control enable register 211 is in the enabled state, the interleave command/address issuing sequencer 254 starts an operation thereof.

In block B901, the nCE signal of the memory control signal group 260 for the nonvolatile memory device selected by the interleave command/address control chip selection register 210 is asserted (nCE signal is at the Low level). In block B902, it is determined whether or not the command data control enable bit 401 of the interleave command/address control enable register 211 is effective.

When the command data control enable bit 401 is effective, the CLE signal of the memory control signal group 260 is asserted (High level) in block B903. In block B904, the control of the nWE signal is carried out in synchronism with a synchronizing signal 216 of the data input/output operation of the data transfer sequencer 253. In block B905, the CLE signal is deasserted (Low level), and then the flow is advanced to the processing of block B906.

When the command data control enable bit 401 is not effective, data transfer on the I/O bus 261 corresponding to the command data is waited for in block B904b, and then the flow is advanced to the processing of block B906.

In block B906, it is determined whether or not the high address data control enable bit 402 of the interleave command/address control enable register 211 is effective.

When the high address data control enable bit 402 is effective, the ALE signal of the memory control signal group 260 is asserted (High level) in block B907. In block B908, the control of the nWE signal is carried out in synchronism with the synchronizing signal 216, and then the flow is advanced to the processing of block B909.

When the high address data control enable bit 402 is not effective, data transfer on the I/O bus 261 corresponding to the high address data is waited for in block B908b, and then the flow is advanced to the processing of block B909.

In block B909, it is determined whether or not the low address data control enable bit 403 of the interleave command/address control enable register 211 is effective. When the low address data control enable bit 403 is effective, the control of the nWE signal is carried out in synchronism with the synchronizing signal 216 in block B910. In block B911, the ALE signal of the memory control signal group 260 is deasserted (ALE signal is at the Low level), and then the flow is advanced to the processing of block B912.

When the low address data control enable bit 403 is not effective, the ALE signal of the memory control group 260 is deasserted (ALE signal is at the Low level) in block B911b. In block B910b, data transfer on the I/O bus 261 corresponding to the low address data is waited for, and then the flow is advanced to the processing of block B912.

In block B912, it is determined whether or not the subcommand data control enable bit 404 of the interleave command/address control enable register 211 is effective. When the subcommand data control enable bit 404 is effective, the CLE signal of the memory control signal group 260 is asserted (High level) in block B913. In block B914, the control of the nWE signal is carried out in synchronism with the synchronizing signal 216. In block B915, the CLE signal is deasserted (Low level), and the flow is advanced to the processing of block B916.

When the subcommand data control enable bit 404 is not effective, data transfer on the I/O bus 216 corresponding to the subcommand data is waited for in block B914b, and then the flow is advanced to the processing of block B916.

In block B916, the nCE signal of the memory control signal group 260 is deasserted (nCE signal is at the high level), thereby terminating the sequencer processing.

Figure 10:
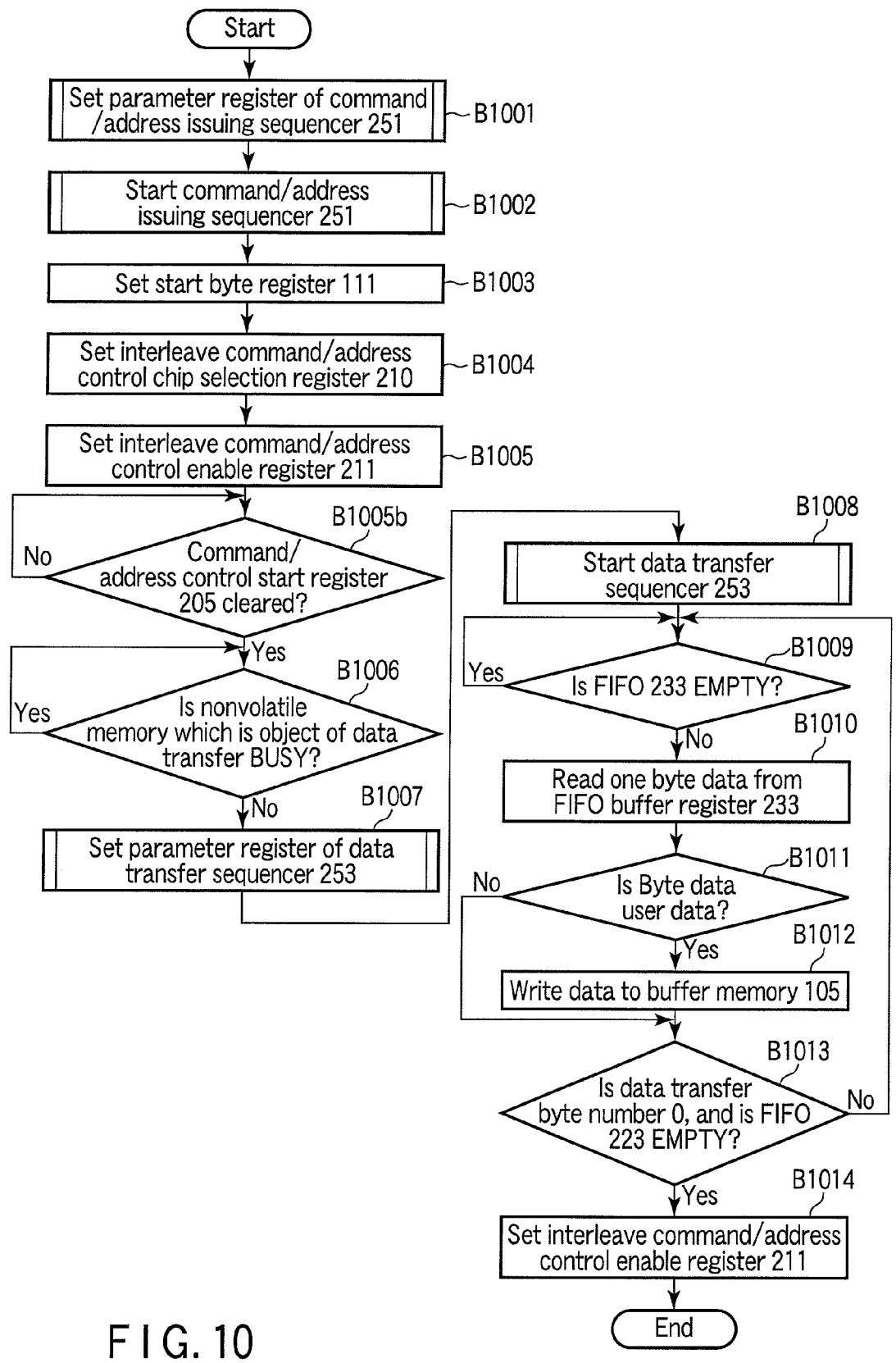
FIG. 10 is an exemplary flowchart showing a control flow of a program 104 of a case where memory interleave control is carried out during read data transfer.

FIG. 10 shows an example of a control flow of a program 104 of a case where memory interleave control is carried out during read transfer of page data from the nonvolatile memory device. For example, when page data 501 is written in advance to a nonvolatile memory device 107 or 108 in a state where the page data 501 can be read by memory interleave control, and readout processing occurs in the user page data 501, the flow of FIG. 10 is started.

In order to read the first page data 501, and operate the command/address issuing sequencer 251, in block B1001, an appropriate value is set in each of the command data register 201, address data register 202, subcommand data register 203, and command/address control chip selection register 200.

In block B1002, the command/address issuing sequencer 251 necessary for page read is operated by write to the command/address control start register 205 in which all the bits are set in the enabled state.

In order to carry out memory interleave control, the data byte offset address on the page data 501 in which memory interleave control data is stored is set in the start byte register 111 in block B1003.

In block B1004, data for selecting the nonvolatile memory device to be memory interleave-controlled is set in the interleave command/address control chip selection register 210.

In block B1005, preliminary preparation for operating the interleave command/address issuing sequencer 254 necessary for the next page read is carried out by write to the interleave command/address control enable register 211 in which all the bits are set in the enabled state.

In block B1005b, the command/address control start register 205 is monitored until the register 205 is brought into the cleared state and, in block B1006, the busy status of the nonvolatile memory device which is the object of the data transfer is monitored by means of the memory busy status register 231. When the nonvolatile memory device is not in the memory busy status, in order to carry out data transfer, and operate the data transfer sequencer 253, an appropriate value is set in each of the data transfer chip selection register 220, write/read transfer direction selection register 222, and data transfer byte number register 221 in block B1007. In block B1008, the data transfer sequencer 253 is operated by carrying out write to the data transfer start register 224.

In block B1009, the FIFO status register 223 is monitored, and it is determined whether or not the FIFO buffer register 233 is empty. When the FIFO buffer register 233 is not empty, page data is stored therein and, in block B1010, the stored page data is read.

In block B1011, it is determined whether or not the read data is the user page data 505. As an example of the method of the determination, there is a method for counting the number of bytes read from the FIFO buffer register 233. When the read data is the user page data 505, the read data is stored at an appropriate address of the buffer memory 105 in block B1012.

In block B1013, it is determined whether or not the value of the data transfer byte number register 221 is 0, and FIFO status register 223 is empty. When the value of the data transfer byte number register 221 is 0, and FIFO status register 223 is empty, this means that data transfer of all items of the page data 501 has been finished, and hence, in block B1014, the enabled state of the interleave command/address control enable register 211 is all cleared, thereby terminating the data transfer processing.

When the value of the data transfer byte number register 221 is 0, and the result of the determination regarding whether or not the FIFO status register 223 is empty is NO, the processing is repeated from the processing of block B1009.

Figure 11:
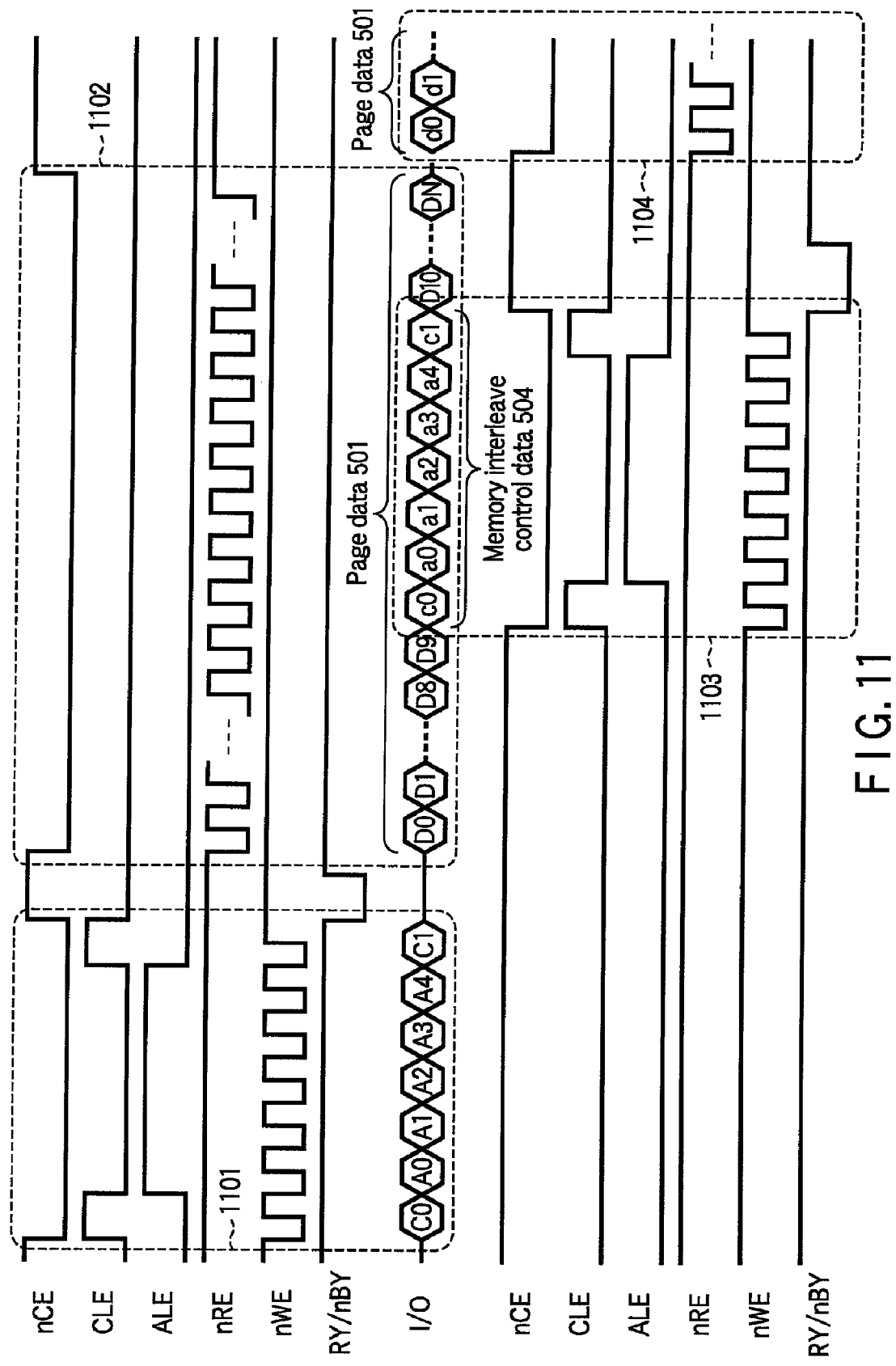
FIG. 11 is an exemplary view showing the nonvolatile memory I/F signal of a case where the memory interleave control flow of FIG. 10 is carried out.

FIG. 11 shows the memory control signal group 260 and data of the I/O bus 261 (hereinafter the memory control signal group 260 together with I/O bus 261 are collectively referred to as the nonvolatile memory I/F signal) of the case where the memory interleave control flow of FIG. 10 is carried out.

A part in FIG. 11 surrounded by a dotted line 1101 shows data of a case where the command/address issuing sequencer 251 is operated in FIG. 10. A part surrounded by a dotted line 1102 shows data of a case where the data transfer sequencer 253 in FIG. 10 is operated. In this case, the data byte offset address set in the start byte register 111 is 10. Accordingly, when the first user data 502 of 10 bytes is transferred on the I/O bus 261, the memory interleave control data 504 is transferred, and thereafter the processing is returned to the transfer of the second user data 503. A part surrounded by a dotted line 1103 shows data of a case where the interleave command/address issuing sequencer 254 in FIG. 10 is operated. A part surrounded by a dotted line 1104 shows part of data of a case where the data transfer sequencer 253 directed to the next page data in FIG. 10 is operated.

Each of FIGS. 12A and 12B shows an example of a state diagram of the nonvolatile memory device of a case where the memory interleave control flow (interleave control data of the memory device 108 is transferred during data transfer to the memory device 107) in the explanation of FIG. 10 is carried out. FIG. 12A shows the memory device state diagram of the nonvolatile memory device 107 for which memory interleave control is not carried out, and FIG. 12B shows the memory device state diagram of the nonvolatile memory device 108 which is the object of the memory interleave control. The IDLE period 1 is a period in a state where no command is accepted, and IDLE period 2 shows a period in a state where a read command can be accepted, and data transfer is readily possible.

FIGS. 13A and 13B show another example of the state diagrams of the nonvolatile memory devices 107 and 108 of the case where the memory interleave control flow in the explanation of FIG. 10 is carried out. Each of FIGS. 13A and 13B shows an example of a case where efficient read data transfer is carried out with respect to the nonvolatile memory device 107 or 108 by combining one processing flow of the command/address issuing sequencer 251, a plurality of processing flows of the data transfer sequencer 253, and a plurality of processing flows of the interleave command/address issuing sequencer 254 with each other.

As for the control flow of this case, it is sufficient if, in the control flow of FIG. 10, the processing from block B1014 to block B1003 is repetitively carried out as the need arises. Further, this control flow is used, for example, when the program 104 which has received, from a host I/F 101, a command to read a user page data 505 of two pages or more designated by the host I/F 101 reads the page data 501 including the user page data 505 from the nonvolatile memory devices 107 and 108 by the memory interleave control through the nonvolatile memory controller 106, and transfers the user data to the host I/F 101 through the buffer memory 105.

Each of FIGS. 14A and 14B shows still another example of the state diagram of the nonvolatile memory device 107 or 108 of a case where the memory interleave control flow in the explanation of FIG. 10 is carried out. Each of FIGS. 14A and 14B shows the state diagram of a case where an appropriate data byte offset address is set in the start byte register 111, whereby the operation of the interleave command/address issuing sequencer 254 necessary for the next page read is delayed to the utmost possible, the IDLE period 1 shown in FIG. 13A or 13B is made longer, and the IDLE period 1 is brought into the state of the low power consumption mode. The low power consumption mode is set by an external cause such as power shutdown or the like for the nonvolatile memory device, or internal cause such as certain signal transfer to the nonvolatile memory device, command issuance or the like, and thus it is possible to realize efficient low power consumption, and high-speed data transfer by virtue of such interleave control.

The above description is associated with the case where the interleave control is carried out during transfer of read data of the page data from the nonvolatile memory device. Further, the case where the interleave control is carried out during transfer of write data of the page data to the nonvolatile memory device will be described below.

Figure 15:
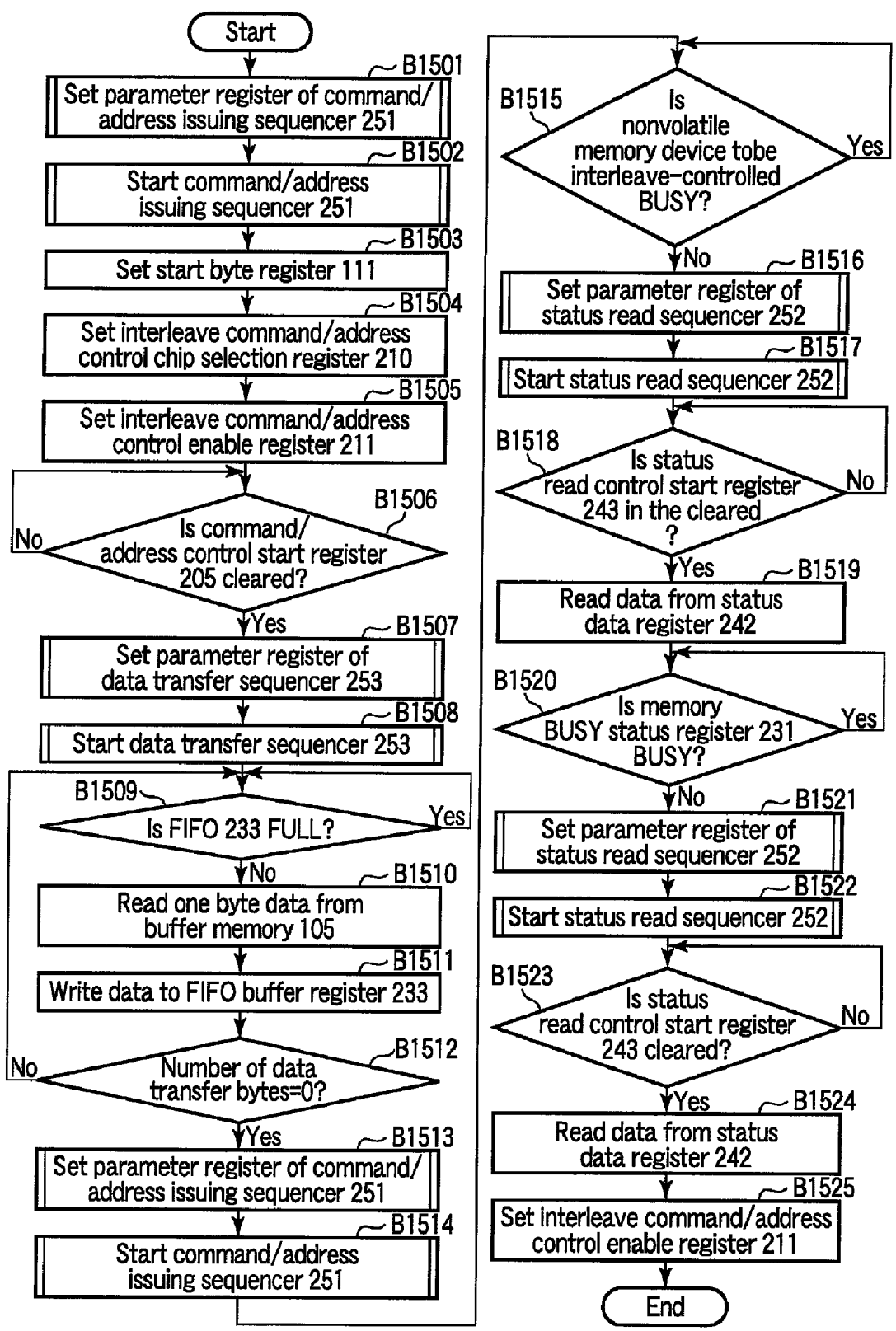
FIG. 15 is an exemplary flowchart showing a control flow of the program 104 of a case where memory interleave control is carried out during write data transfer.

FIG. 15 shows an example of a control flow of the program 104 of a case where the interleave control is carried out during transfer of write data of the page data to the nonvolatile memory device. For example, in the case where when user page data 505 is written to one of a pair of nonvolatile memory devices, whereas an arbitrary deletion block is to be deleted from the other one of the nonvolatile memory device, it is assumed that appropriate interleave control data 504 used to delete the deletion block is prepared in advance on the buffer memory 105, user page data 505 to be written is present on the buffer memory 105, and page data to be written from each of the interleave control data 504 and user page data 505 to the nonvolatile memory device is prepared in advance on the buffer memory 105 by a method such as memory-to-memory copy or the like. Then, the flow of FIG. 15 is started by the occurrence of the write processing of the page data 501.

In order to write the page data 501, and operate the command/address issuing sequencer 251, an appropriate value is set, in block B1501, in each of the command data register 201, address data register 202, subcommand data register 203, and command/address control chip selection register 200.

In block B1502, the command/address issuing sequencer 251 necessary for page write is operated by the write to the command/address control start register 205 in which all the bits other than the subcommand are brought into the enabled state.

In order to carry out the memory interleave control, the data byte offset address on the page data 501 in which the memory interleave control data is stored is set in the start byte register 111 in block B1503.

In block B1504, data used to select the nonvolatile memory device to be memory interleave-controlled is set in the interleave command/address control chip selection register 210.

In block B1505, preliminary preparation for operating the interleave command/address issuing sequencer 254 configured to carry out deletion processing of the block to be deleted is carried out by write to the interleave command/address control enable register 211 in which all the bits other than the low address data control enable bit 403 are set in the enabled state.

In block B1506, the command/address control start register 205 is monitored until the register 205 is brought into the cleared state and, in order to carry out data transfer, and operate the data transfer sequencer 253, an appropriate value is set in block B1507 in each of the data transfer chip selection register 220, write/read transfer direction selection register 222, and data transfer byte number register 221. In block B1508, the data transfer sequencer 253 is operated by the write to the data transfer start register 224.

In block B1509, the FIFO status register 223 is monitored to determine whether or not the FIFO buffer register 233 is full. When the FIFO buffer register 233 is not full, one byte of appropriate data is read from the page data 501 on the buffer memory 105 in block B1510, and the read data is written to the FIFO buffer register 233 in block B1511.

In block B1512, it is determined whether or not the value of the data transfer byte number register 221 is 0. When the value of the data transfer byte number register is not 0, the processing from block B1509 is repeated. When the value is 0, in order to issue a subcommand to the nonvolatile memory device which is the object of the data transfer control, an appropriate value is set in block B1513 in each of the command data register 201, address data register 202, subcommand data register 203, and command/address control chip selection register 200.

In block B1514, the command/address issuing sequencer 251 is operated by write to the command/address control start register 205 in which the subcommand is set in the enabled state. In block B1515, the busy status of the nonvolatile memory device which is the object of the interleave control is monitored by means of the memory busy status register 231. In order to confirm presence/absence of a success in erase control of the nonvolatile memory device which is the object of the interleave control, an appropriate value is set in block B1516 in each of the status read control chip selection register 240, and status read command data register 241. In block B1517, the status read sequencer 252 is operated by write to the status read control start register 243. In block B1518, the status read control start register 243 is monitored to determine whether or not the register 243 has been brought into the cleared state. In block B1519, status data is read from the status data register 242.

In block B1520, the busy status of the nonvolatile memory device which is the object of the data transfer is monitored by means of the memory busy status register 231. In order to confirm presence/absence of a success in the data write control of the nonvolatile memory device which is the object of the data transfer, an appropriate value is set in block B1521 in each of the status read control chip selection register 240, and status read command data register 241. In block B1522, the status read sequencer 252 is operated by write to the status read control start register 243.

In block B1523, the status read control start register 243 is monitored to determine whether or not the register 243 has been brought into the cleared state. Then in block B1524, status data is read from the status data register 242 and, in block B1525, all the enabled statuses of the interleave command/address control enable register 211 are cleared, thereby terminating the data transfer processing.

In the processing flow described above, the processing from block B1515 to block B1519, and processing from block B1520 to block B1524 may be replaced with each other at the appropriate times. Further, when the status data is read from the status data register 242 in block B1519 or B1525, if the status data indicates an error, this means occurrence of an erroneous deletion block or the like, and hence a procedure of carrying out retry processing such as replacement of the block or the like is conceivable. However, the above is not directly associated with the embodiment, and hence the processing procedure is not regarded as important. Further, it is assumed that the deletion block is constituted of at least one page.

FIGS. 16A and 16B show the nonvolatile memory I/F signal of a case where the memory interleave control flow in FIG. 15 is carried out.

Figure 16:
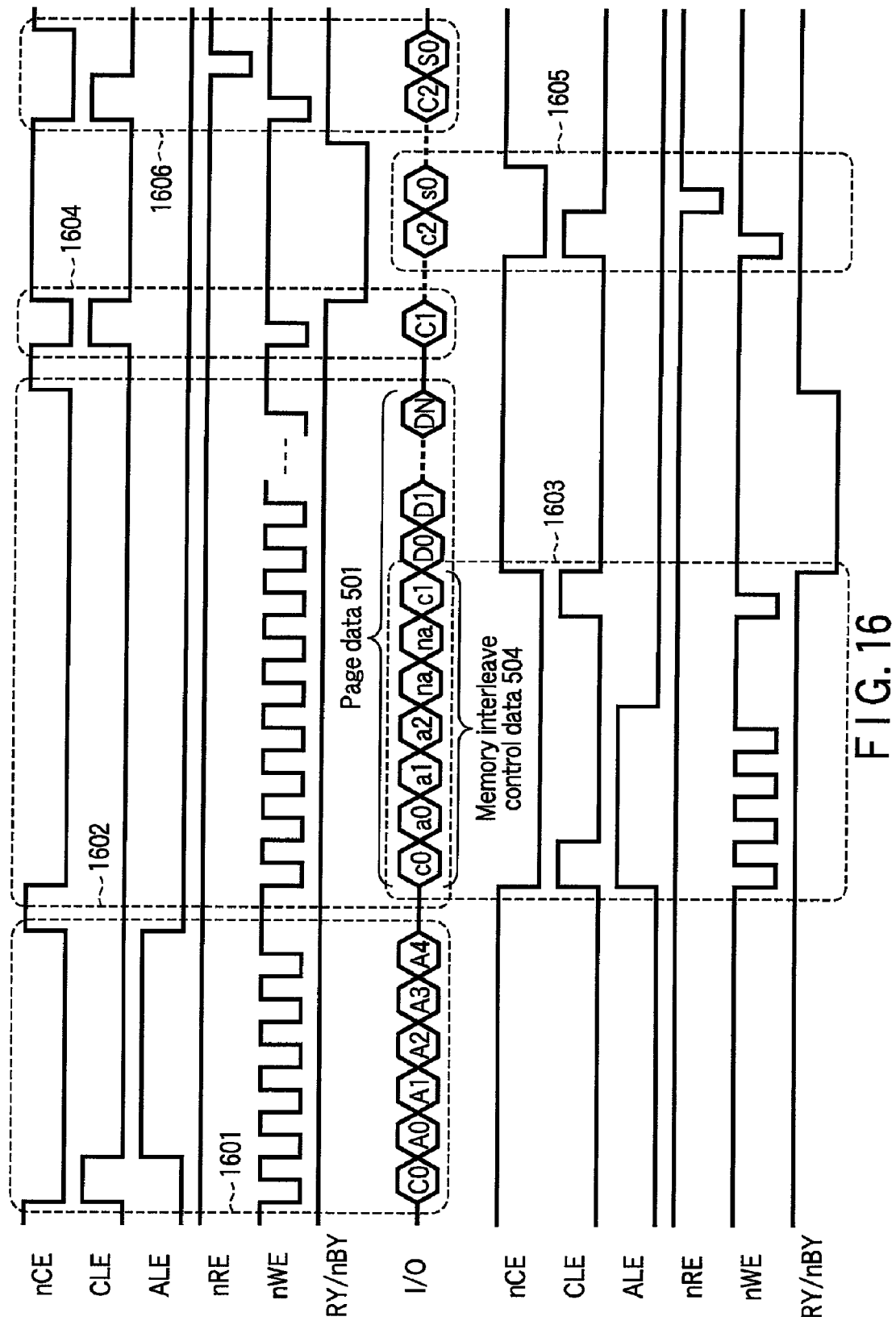
FIG. 16 is an exemplary view showing the nonvolatile memory I/F signal of a case where the memory interleave control flow of FIG. 15 is carried out.

A part in FIG. 16 surrounded by a dotted line 1601 shows data of a case where the command/address issuing sequencer 251 is operated to issue the command and address in FIG. 15. A part surrounded by a dotted line 1602 shows data of a case where the data transfer sequencer 253 in FIG. 15 is operated. In this case, the data byte offset address set in the start byte register 111 is 1. Accordingly, before the user page data 505 is transferred on the I/O bus 261, the memory interleave control data 504 is transferred, and thereafter transfer of the user page data 505 is started. That is, the user page data 505 is not divided. A part surrounded by a dotted line 1603 shows data of a case where the interleave command/address issuing sequencer 254 in FIG. 15 is operated. A part surrounded by a dotted line 1604 shows data of a case where the command/address issuing sequencer 251 is operated to issue the sub-command in FIG. 15. A part surrounded by a dotted line 1605 shows data of a case where the status read sequencer 252 is operated for the nonvolatile memory device which is the object of the interleave control in FIG. 15. A part surrounded by a dotted line 1606 shows part of data of a case where the status read sequencer 252 is operated for the nonvolatile memory device which is the object of the data transfer in FIG. 15.

Each of FIGS. 17A and 17B shows an example of a state diagram of the nonvolatile memory device of a case where the interleave control flow (interleave control data is transferred to the memory device 108 during data transfer to the memory device 107) in the explanation of FIG. 15 is carried out. FIG. 17A shows the state diagram of the nonvolatile memory device 107 which is not subjected to the memory interleave control, and FIG. 17B shows the state diagram of the nonvolatile memory device which is the object of the memory interleave control. The IDLE period 1 is a period in a state where no command is accepted, and IDLE period 2 shows a period in a state where a write command is accepted, further data transfer is finished, or an erase command is accepted, further erase processing is finished, and transfer of the status data of the command processing is readily possible.

Each of FIGS. 18A and 18B shows another example of the state diagram of the nonvolatile memory device 107 or 108 of a case where the memory interleave control flow in the explanation of FIG. 15 is carried out. Each of FIGS. 18A and 18B shows an example of a case where efficient write data transfer is carried out with respect to the nonvolatile memory device 107 or 108 by combining one processing flow of the command/address issuing sequencer 251, a plurality of processing flows of the data transfer sequencer 253, and a plurality of processing flows of the interleave command/address issuing sequencer 254 with each other.

As for the control flow of this case, it is sufficient if, in the control flow of FIG. 15, the processing from block B1525 to block B1503 is repetitively carried out as the need arises. Further, this control flow is used, for example, when the program 104, which has received from a host I/F 101 a command to write a user page data 505 of two pages or more designated by the host I/F 101, receives the user data 505 from the host I/F 101 through the buffer memory 105, successively writes the user data 505 to an arbitrary page data 501 section of the nonvolatile memory device 107 or 108, at this time when the arbitrary page data 501 to which the user data 505 is to be written has not been erased, suitable data is set in the memory interleave control data 504 of the preceding page data 501, the memory interleave control through the nonvolatile memory controller 106 is carried out, and the arbitrary page data 501 to which the user data 505 is to be written is erased, whereby the user data 505 is transferred to the nonvolatile memory device 107 or 108 without separately operating the command/address issuing sequencer 251 to carry out erase processing.

Each of FIGS. 19A and 19B shows a state diagram of a case where the IDLE period 1 shown in FIGS. 18A and 18B is set in the low power consumption mode state. The low power consumption mode is set by an external cause such as power shutdown or the like for the nonvolatile memory device, or internal cause such as certain signal transfer to the nonvolatile memory device, command issuance or the like, and thus it is possible to realize efficient low power consumption, and high-speed data transfer by virtue of such interleave control.

As described above, according to the first embodiment, it is possible to reduce the command/address issuance time necessary for the interleave control by providing the memory interleave control data at an arbitrary part of the page data, and transferring data necessary for the memory interleave access control at the time of page data transfer, and the memory access efficiency is enhanced by carrying out the interleave control at an arbitrary timing. Further, the memory interleave control data 504 can be easily changed at the time of write data transfer by firmware, at the time of programming. At the time of read data transfer, the memory interleave control data 504 can be easily changed by previously rewriting the combination address of the interleave control, and the memory address used to access the memory interleave can arbitrarily be set.

Modification Example

The present invention is not limited to the embodiment described above, and can be variously modified and implemented. For example, in the above description, although only one memory interleave control data 504 is provided in the middle part of the page data 501 as shown in FIG. 5A, items of the memory interleave control data may be provided.

FIG. 20 shows an example in which items of the memory interleave control data 2004 and 2005 are provided in the page data 2001. In this example, depending on the positions of the items of the memory interleave control data 2004 and 2005, the user data 2002 and 2003 are separated from each other in some cases. Further, regarding the items of the memory interleave control data 2004 and 2005, it is possible to select and use one of the data 2004 and 2005 to carry out the processing by the interleave command/address issuing sequencer 254 by setting an appropriate data byte offset address in the start byte register 111. Further, it is possible to operate a plurality of interleave command/address issuing sequencers 254 during one page data transfer by providing a plurality of interleave command/address issuing sequencers 254, or by setting, after an operation of an interleave command/address issuing sequencer 254 using one memory interleave control data 2004, a data byte offset address suitable for the next memory interleave control data 2005 in the start byte register 111.

It is possible to employ a configuration of the memory interleave control data 504 other than the configuration shown in FIG. 5C.

FIG. 21 shows the configuration in which in addition to the data group necessary to control the nonvolatile memory device, including the command data c0, high address data a0, a1, a2, low address data a3, a4, and subcommand data c1, the chip selection data cue is additionally provided in the memory interleave control data 2101. In this case, it is necessary to select the device which is the object of the interleave by using the chip selection data cue.

Figure 22:
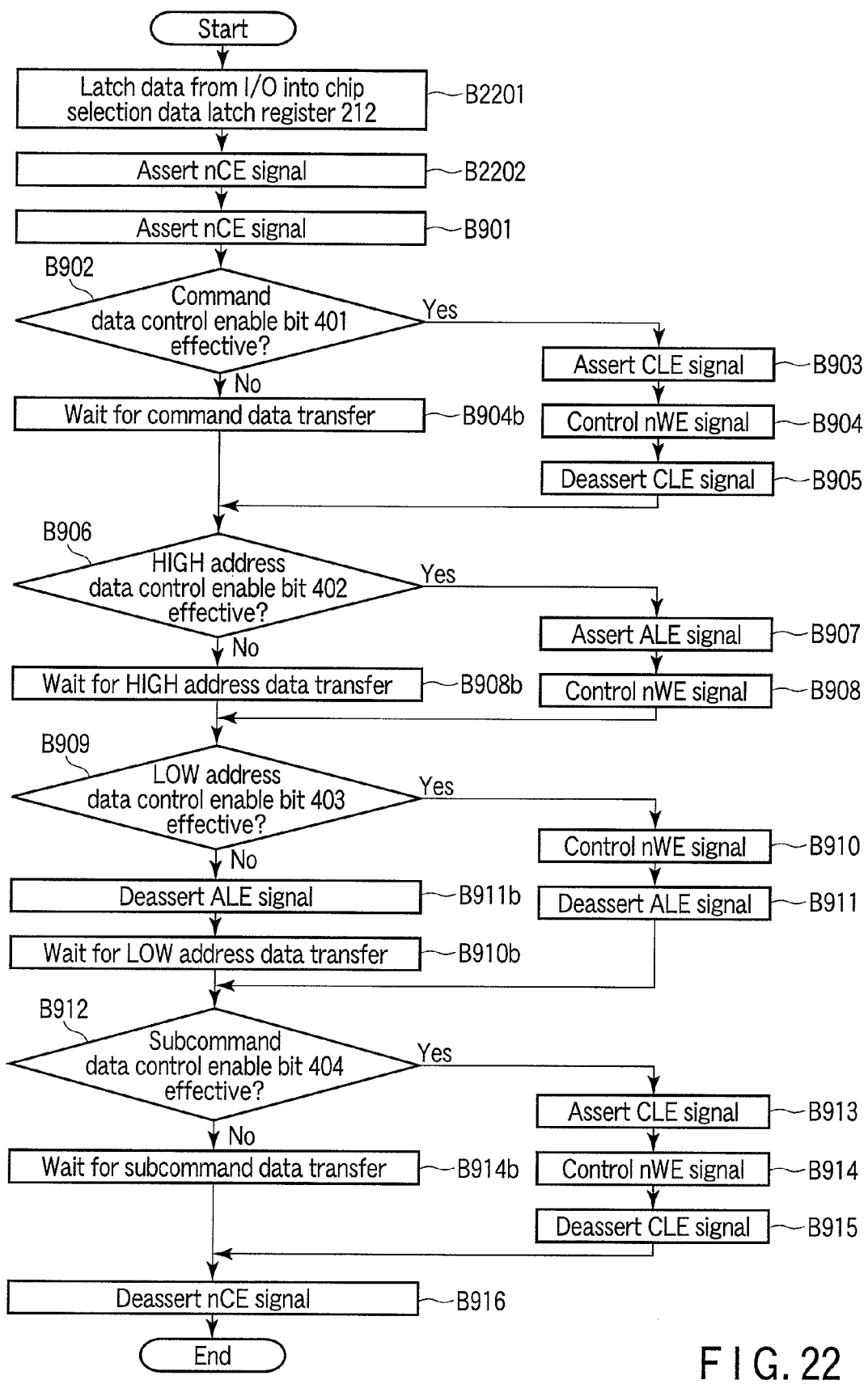
FIG. 22 is an exemplary flowchart showing a processing flow of the interleave command/address issuing sequencer in the memory interleave control data shown in FIG. 21.

FIG. 22 shows the processing flow of the interleave command/address issuing sequencer 254 in the memory interleave control data 2101 shown in FIG. 21.

Upon receipt of an interleave command control start signal 213 in a state where any one of the effective bits of the interleave command/address control enable register 211 is in the enabled state, the interleave command/address issuing sequencer 254 starts an operation thereof, then latches the chip selection data cue into the chip selection data latch register 212 in synchronism with the synchronizing signal 216 of the data input/output operation of the data transfer sequencer 253 (block B2201), carries out assertion (nCE signal is at the Low level) of the nCE signal of the memory control signal group 260 for the nonvolatile memory device selected by the chip selection data latch register 212 (block B2202), and then terminates the processing through the processing flow shown in FIG. 9.

As has been described above, according to the present embodiment, the command/address issuance time necessary for the interleave control can be reduced, and the memory access efficiency is improved by providing the memory interleave control data at an arbitrary part of the transfer data, and carrying out the memory interleave access control during the data transfer.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. An interleave control device of a memory system comprising a memory comprising sections, and a data bus for data transfers between the sections, the device comprising:
   a detector configured to detect a completion of transfer of data of a predetermined size during a transfer of data on the data bus to be written to a section of the memory or data read from the section; and
   a start module configured to start a transfer of interleave control data in place of the data to be written or the read data when the detector detects the completion of transfer of the data of the predetermined size.

2. The interleave control device of claim 1, wherein the detector comprises a register configured to store data indicating the predetermined size, a counter configured to measure a size of the transferred data to be written or read data, and a comparator configured to compare the data in the register and a count value of the counter and to output a start signal when the comparator detects a correspondence between the data in the register and the count value, and the start module is configured to start the transfer of the interleave control data in response to the start signal.

3. The interleave control device of claim 1, wherein the start module is configured to start the transfer of the interleave control data each time the detector detects a completion of transfer of one of data items of the predetermined size.

4. The interleave control device of claim 1, wherein the memory comprises three or more sections, and the interleave control data comprises data for selecting a section for an interleave control.

5. An interleave control method of a memory system comprising a memory comprising sections, and a data bus for data transfers between the sections, the method comprising:
   detecting a completion of transfer of data of a predetermined size during a transfer of data on the data bus to be written to a section of the memory or data read from the section; and
   starting a transfer of interleave control data in place of the data to be written or the read data when the completion of transfer of the data of the predetermined size is detected.

6. The interleave control method of claim 5, wherein the detecting comprises:
   setting data indicating the predetermined size in a register; measuring a size of the transferred data to be written or the transferred read data; and comparing the data in the register and a count value of the counter, and;
   outputting a start signal when the comparator detects a correspondence between the data in the register and the count value; and wherein the starting comprises starting the transfer of the interleave control data in response to the start signal.

7. The interleave control method of claim 5, wherein the starting comprises starting the transfer of the interleave control data each time a completion of transfer of one of data items of the predetermined size is detected.

8. The interleave control method of claim 5, wherein the memory comprises three or more sections, and the interleave control data comprises data for selecting a section for an interleave control.

9. A memory system connectable to a host system, comprising:
   nonvolatile semiconductor memories;
   a data bus connected to the nonvolatile semiconductor memories; and
   a memory controller connected to the host system, further connected to the nonvolatile semiconductor memories, and configured to control data transfer on the data bus, wherein the memory controller comprises:
      a detector configured to detect a completion of transfer of data of a predetermined size during a transfer of data on the data bus to be written to a section of the memory or data read from the section; and
      a start module configured to start a transfer of interleave control data in place of the data to be written or the read data when the detector detects the completion of transfer of the data of the predetermined size.

10. The system of claim 9, wherein the detector comprises a register configured to store data indicating the predetermined size, a counter configured to measure a size of the transferred data to be written or read data, and a comparator configured to compare the data in the register and a count value of the counter and to output a start signal when the comparator detects a coincidence, and the start module is configured to start the transfer of the interleave control data in response to the start signal.

11. The system of claim 9, wherein the start module is configured to start the transfer of the interleave control data each time the detector detects a completion of transfer of one of data items of the predetermined size.

12. The system of claim 9, wherein the memory comprises three or more sections, and the interleave control data comprises data for selecting a section for an interleave control.

13. The memory system of claim 9, wherein the interleave control data comprises an address of the nonvolatile memory, and a command.

* * * * *